June 28, 1960  G. A. LYON  2,942,569
METHOD OF MAKING WHEEL COVERS
Filed Nov. 5, 1956  4 Sheets-Sheet 2
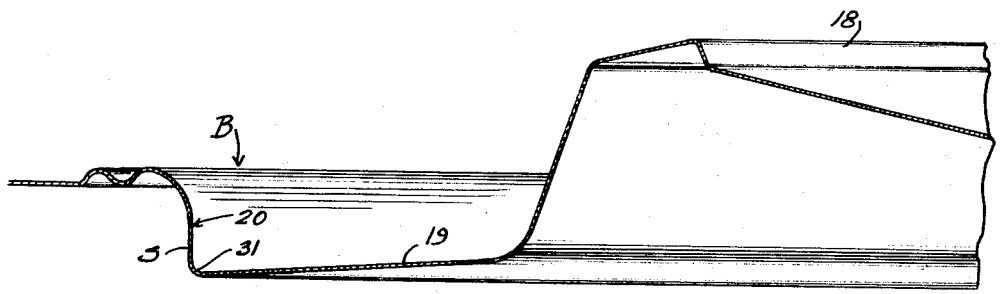
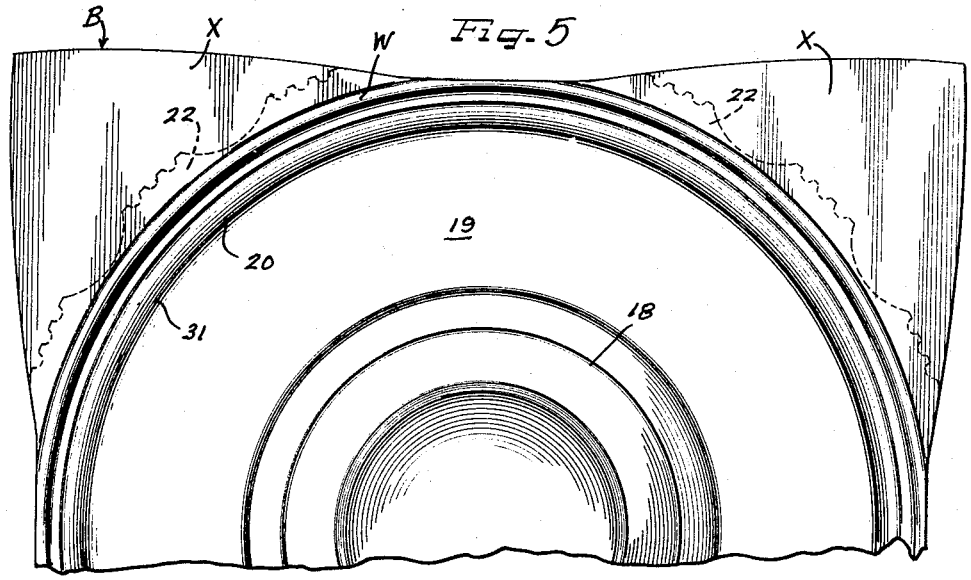
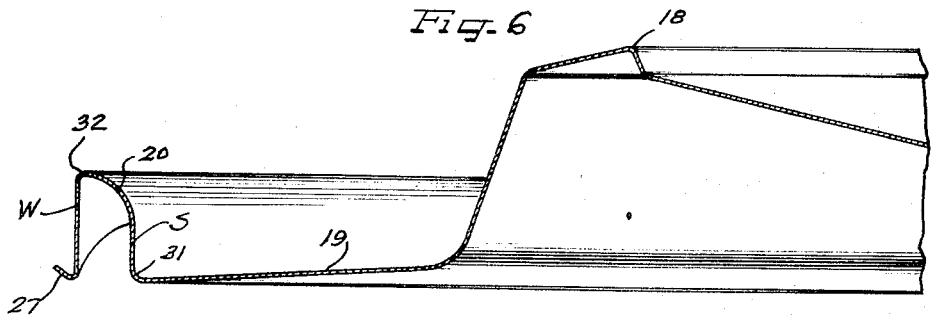
Inventor
GEORGE ALBERT LYON Inventor
GEORGE ALBERT LYON June 28, 1960  G. A. LYON  2,942,569
METHOD OF MAKING WHEEL COVERS
Filed Nov. 5, 1956  4 Sheets-Sheet 4

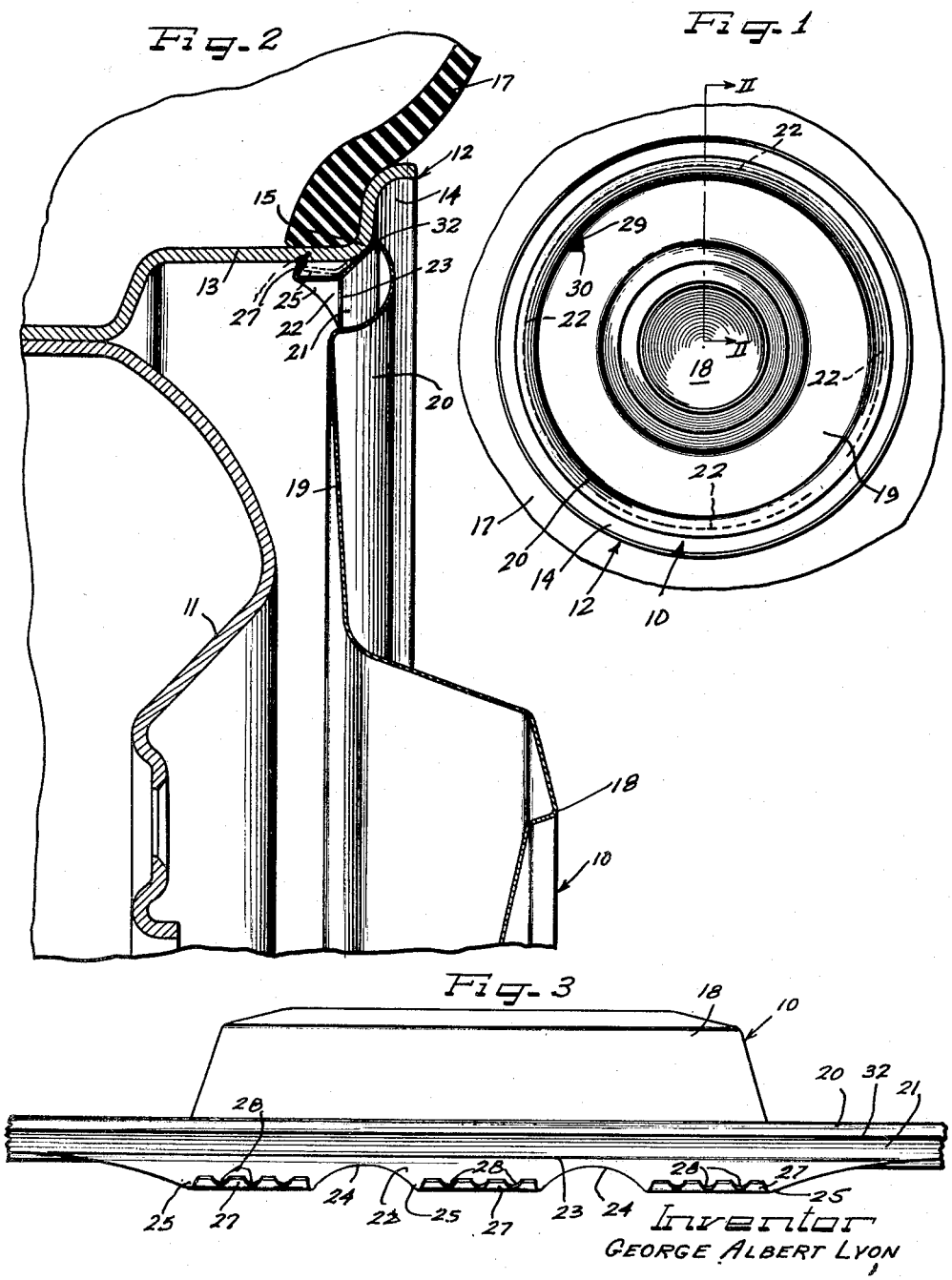

Inventor
GEORGE ALBERT LYON
by Hill Sherman, Meroni, Gross & Simpson Attys.

United States Patent Office 2,942,569
Patented June 28, 1960

2,942,569
METHOD OF MAKING WHEEL COVERS
George Albert Lyon, 13881 W. Chicago Blvd., Detroit, Mich.

Filed Nov. 5, 1956, Ser. No. 620,288

6 Claims. (Cl. 113—116)

The present invention relates to wheel covers and making the same and more particularly concerns the ornamental and protective covering of the outer sides of vehicle wheels.

An important object of the present invention resides in the provision of an improved wheel cover having novel cover retaining structure formed thereon.

Another object of the invention is to provide an improved cover for the outer side of a vehicle wheel and provided with cover retaining finger means carried by a resiliently flexible marginal portion of the cover.

A further object of the invention is to provide an improved method of making wheel covers.

Still another object of the invention is to provide an improved method of providing vehicle wheel covers with concealed marginal cover retaining finger structure.

Yet another object of the invention is to provide improved apparatus for making wheel covers.

Other objects, features and advantages of the present invention will be readily apparent from the following detailed description of a preferred embodiment thereof taken in conjunction with the accompanying drawings in which:

Figure 1 is an outer side elevational view of a wheel structure embodying features of the invention;

Figure 2 is an enlarged fragmentary radial sectional detail view taken substantially on the line II—II of Figure 1;

Figure 3 is a fragmentary side elevational view of the cover;

Figure 4 is a fragmentary radial sectional view through a cover blank in an initial stage in the manufacture of a wheel cover;

Figure 5 is a fragmentary outer side elevational view of the cover blank of Figure 4;

Figure 6 is a radial sectional view similar to Figure 4 but showing the cover blank in a subsequent stage of manufacture;

Figure 7:
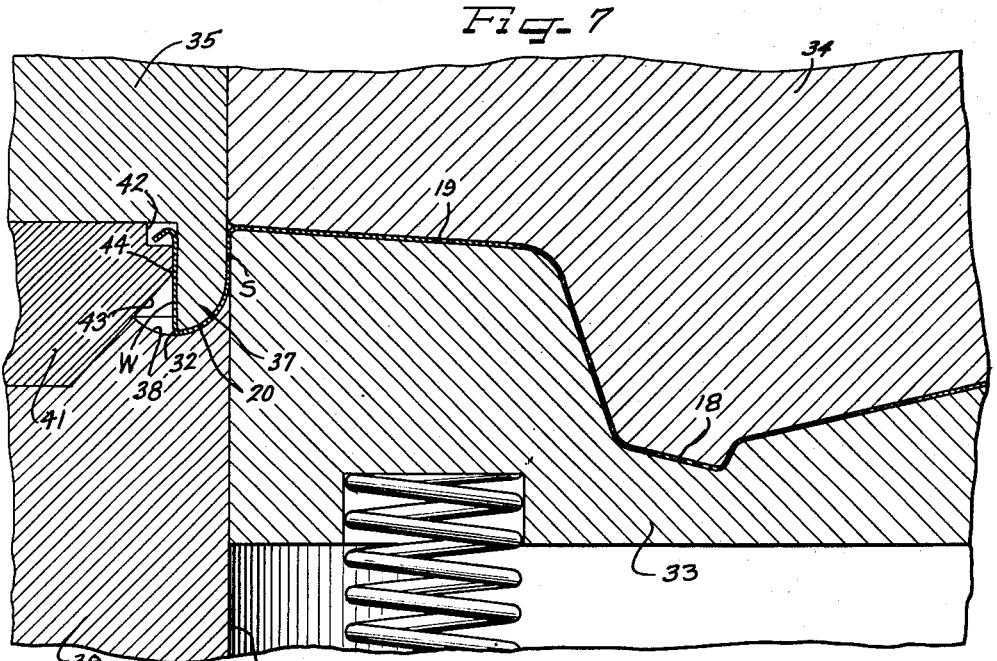
Figure 7 is a fragmentary, more or less schematic, radial sectional detail view through the cover blank and a forming die apparatus for further forming the cover blank and more particularly the marginal structure thereof after the blank has been shaped to the form shown in Figure 6.
Figure 9:
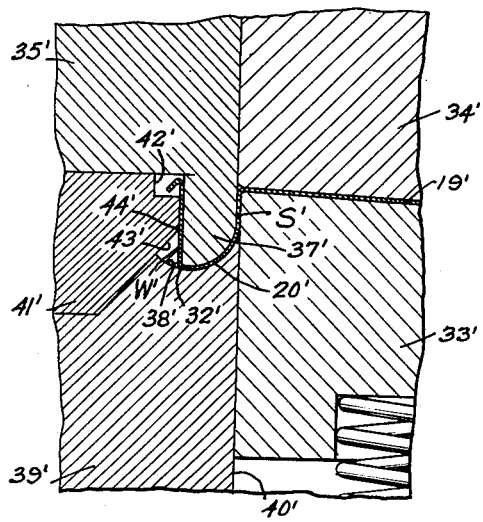
Figure 10:
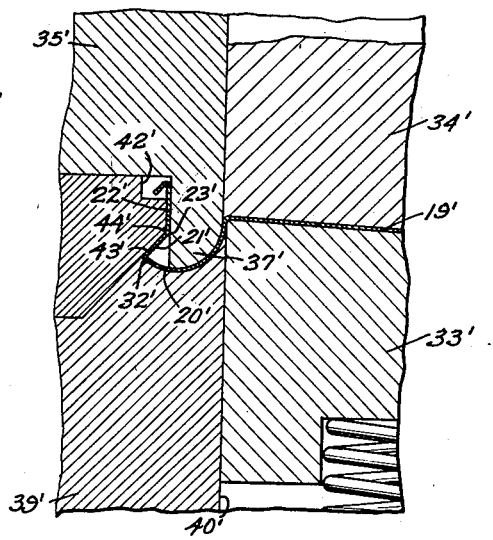
Figure 11:
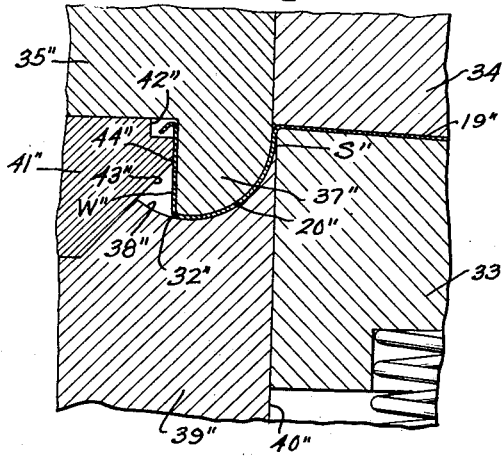
Figure 12:
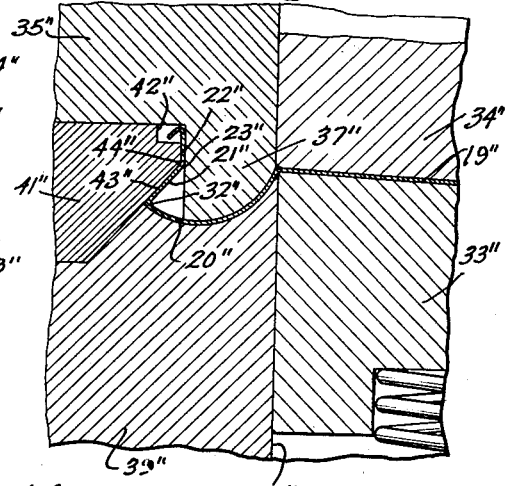
Figure 13:
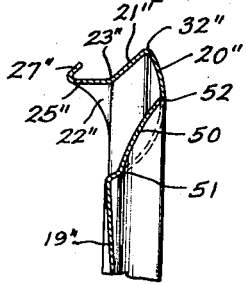
Figure 14:
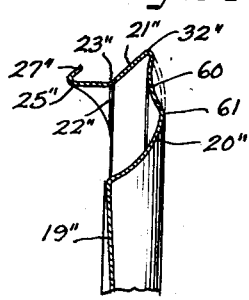

Figure 9 is a more or less schematic fragmentary radial sectional detail view through a slightly modified cover blank, such modification being in the marginal axially outwardly projecting rib formation, and a vertical sectional view through forming die apparatus of substantially the same structure and operation as the form die apparatus of Figure 7, but modified to accommodate the modified marginal rib formation, and similarly as in Figure 7 showing the position of the several parts of the die assembly when the cover blank is fully clamped therein just before the marginal rib is worked therein;

Figure 10 is a vertical, general radial sectional detail view similar to Figure 9 but showing the relationship of the die parts and the cover at the completion of the marginal rib working operation or stroke of the apparatus;

Figure 11 depicts a radial sectional detail view through a further modification of the cover blank insofar as the marginal rib formation is concerned, and is a radial vertical sectional view through die apparatus similar to the die apparatus of Figures 7 and 9 but modified to accommodate the modified marginal rib formation of the cover blank;

Figure 12 is a view similar to Figure 11 but showing the die apparatus in the relative disposition of the parts at completion of the rib working stroke or operation thereof;

Figure 13 is a fragmentary radial sectional view through the completed marginal portion of the modified cover of Figures 11 and 12 showing indentation of the worked rib formation for rigidifying the same according to one ornamental option; and Figure 14 is a view similar to Figure 13 but showing another ornamental option with respect to disposition of the reinforcing indentation or rib worked in the cover margin.

A cover 10 (Figs. 1 and 2) embodying features of the present invention is constructed and arranged to be applied in press-on, pry-off relation to the outer side of a vehicle wheel such as an automobile wheel including a disk spider wheel body 11 supporting a tire rim 12 of the multi-flange, drop center type. The tire rim 12 includes an intermediate axially outwardly extending and generally radially inwardly facing flange 13 and a terminal flange 14 which is joined to the axially outer side of the intermediate flange on a juncture shoulder 15 and extends generally radially outwardly and then axially outwardly. A pneumatic tire 17 is adapted to be supported by the tire rim.

Suitable material from which the wheel cover 10 may be made comprises thin gauge cold work hardenable sheet brass or stainless steel adapted to be finished by polishing and plating. At its center the wheel cover 10 includes a crown portion 18 for overlying the wheel body 11 and bordered by an annular more or less inwardly dished portion 19 which in the present instance is of substantial width and may be substantially straight and sloping slightly axially inwardly. From the radially outer side of the intermediate cover portion 19 is an annular marginal portion 20 diverging generally radially and axially outwardly therefrom and in the present instance preferably in the form of a reinforcing and resiliency imparting rib of substantial width adapted to overlie the tire rim 12.

At its radially outer extremity, the annular marginal rib portion 20 is of a diameter to overlie the inner portion of the terminal flange 14 inclusive of the juncture 15. Extending integrally in one piece from the extremity of the rib 20 is an underturned generally axially and radially inwardly oblique shoulder flange 21 engageable against the juncture shoulder 15 of the tire rim and by its oblique disposition, diverging from the extremity of the marginal rib 20, and by virtue of facing generally axially inwardly and radially outwardly, engaging the rim shoulder 15 not only as an axial stop for determining the axially inward disposition of the cover 10 relative to the wheel, but also serving as a centering frustum in engagement with the rim shoulder.

For retaining the cover 10 against axially outward displacement, the underturned flange 21 has extending therefrom cover retaining means herein in the form of respective generally axially inwardly extending retaining finger flange extensions 22 of which there may be several, herein four as indicated in dash lines in Figure 1. Each of the finger extensions is of substantial width and curved circumferentially so as to be of substantial stiffness against radial deflection. The diameter described by the retaining finger flanges 22 is somewhat less than the inside face diameter of the axially outer portion of the generally axially extending intermediate flange 13 of the tire rim.

Juncture of the retaining finger flanges 22 with the underturned flange 21 is on a reinforcing juncture bend 23 which because of its considerable length as best seen in Figure 3 and circumferential curvature provides a substantial rigidifying rib enhancing the resilient stiffness of the finger extensions 22. The length of the reinforcing juncture rib 33 is substantially increased by having the sides of the finger flanges 22 widely tapering toward juncture with the edge extremity of the underturned flange 21 intermediate the fingers. Herein four of the fingers 22 are shown but there could be more or less such fingers.

Each of the finger extension flanges 22 is preferably sub-divided by one or more shallow notches or cut-outs 24 into a plurality of short retaining finger extremities 25 having widely flaring sides joining one another and with the sides of the finger extensions 22 comprising the flaring outer sides of the sidemost retaining finger extremity portions 25. By such sub-division of the wide finger extension extremity portions ready self-adjustment to manufacturing variables is provided. Each of the finger portions 25 is provided with a retaining terminal in the present instance comprising a generally radially and axially outwardly oblique short and stiff terminal flange 27. All of the terminal flanges 27 project at their tips to a diameter which is somewhat greater than the diameter of the inside face of the axially outer portion of the intermediate flange 13 so that the terminal edges can engage in gripping biting resiliently tensioned relation against the intermediate flange. For improving the turn-preventing biting engagement of the terminal flanges 27 with the rim flange, each of the terminals is preferably notched out at a plurality of places 28 to afford a plurality of generally circumferentially directed biting corners which bitingly anchor the cover against turning due to rotational torque or torsion in service on the wheel.

In applying the cover 10 to the outer side of the wheel, a valve stem aperture 29 is generally registered with a valve stem 30 and the cover is pressed axially inwardly onto the wheel. This causes the short stiff retaining terminals 27 to cam axially and radially inwardly along the sloping inner surface of the terminal flange 13 from the rounded juncture shoulder 15. Gradual radially inward deflection of the retaining finger extremities 25 and the retaining finger flanges 22 occurs until the underturned shouldering flange 21 seats against the shoulder 15. As a result of the radially inward deflection of the retaining fingers, and the relatively short and stiffly resilient form thereof the underturned oblique seating and centering flange 21, which is of substantial width and resilience is resiliently deflected generally radially and axially inwardly and may even involve the overlying, concealing resilient marginal rib formation 20 so as to impart substantial and retainingly effective resilient thrust to the retaining terminals 27 for effectively retaining the cover against both axially outward and torsional displacement.

To remove the cover from the wheel, a pry-off tool such as a screwdriver or the like may be inserted behind the underturned seating flange 21 and pry-off leverage applied by levering the pry-off tool against the terminal flange 14 to cause the retaining finger terminals 27 to slide axially outwardly out of retaining engagement with the tire rim.

In making the cover 10, a cover blank B (Figs. 4 and 5) is initially drawn to provide the crown portion 18, the intermediate portion 19 and in a rudimentary form the outer marginal portion 20 which at this time is preferably of a generally axially outwardly extending form including a preferably substantially straight portion S joining the radially outer extremity of the intermediate portion 19 on an annular short radius reinforcing rib juncture 31. At its axially outer portion the annular cover portion 20 is preferably curved to extend generally radially outwardly, but at this stage of the formation facing generally radially inwardly and axially outwardly. About the outer extremity of the marginal portion 20 at this stage in the manufacture is a cold worked annular peripheral portion W from which extends a plurality of corner marginal portions X from the original preferably polygonal blank of sheet material in which the cover is drawn. It will be noted that the blank of material is of as small dimensions as practicable, for purposes of economy, and the drawing is effected in such a manner that the intermediate portions of the original edge of the blank run into the peripheral extremity of the circular draw defined by the annular portion W. At the completion of the draw to the extent depicted in Figure 5, the sides of the corner portions X merge on a generally concave contour with the peripheral run out of the portion W at the edges of the blank.

The retaining fingers 22 are then blanked out of the corner portions X of the blank B as shown in dash outline in Figure 5. In doing this, the side portions of the finger flanges coincide with the original mill cut or sheared edges of the blank which are substantially burr-free.

Following the blanking out of the fingers 22, the cover blank is subjected to marginal working whereby the annular worked portion W is straightened out into preferably substantially cylindrical axially inward position with the finger flange portions also straightened out axially inwardly as unilinear extensions of the portion W. An angular juncture 32 joins the portion W to the annular curved portion 20. At this time, also, the retaining finger terminal flanges 27 are preferably bent up, as shown in Figure 6.

Figure 8:
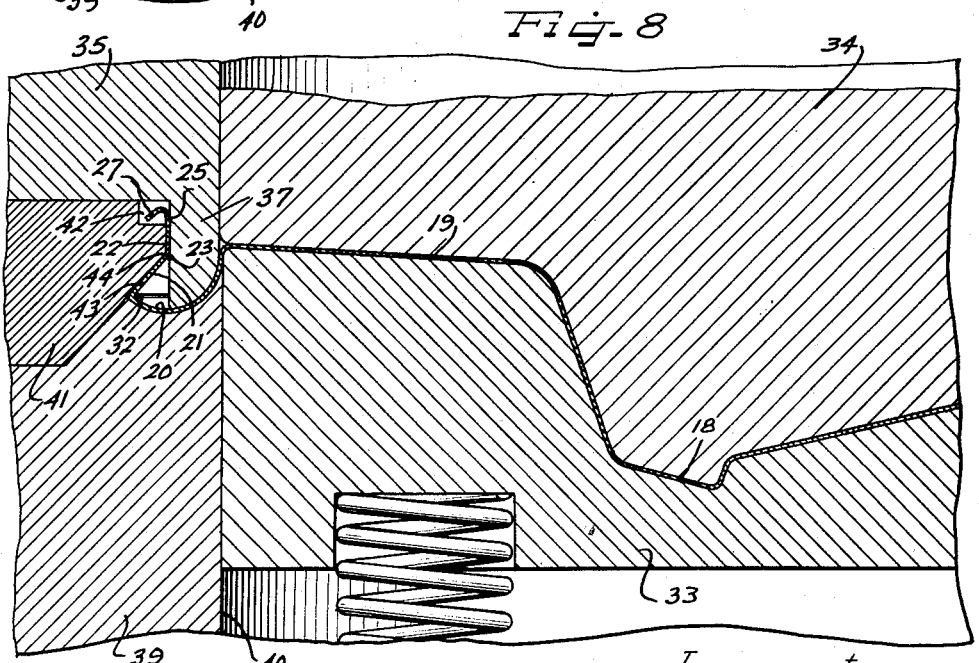
Figure 8 is a view similar to Figure 7 showing the die apparatus at the completion of the forming operation thereof.

As a final forming operation, the marginal cover portion 20 is moved generally radially outwardly into concealing relation to the retaining fingers and the flange portion 21 is turned under from the axially extending marginal portion W. This is preferably effected in shaping die apparatus as shown in Figures 7 and 8. In this apparatus, the cover blank shaped to the condition shown in Figure 6 is placed in inverted position.

Within the finishing die apparatus, the inverted partially formed cover member is supported upon a vertically reciprocable spring mounted circular supporting member 33 having its supporting surface contoured complementary to and receptive of the cover crown portion 18 and the cover intermediate portion 19, with the outer periphery of the die member 33 engageable slidably within the cylindrical portion S of the cover blank marginal formation. An upper complementary punch die member 34 engages and clamps the cover crown and intermediate portions 18 and 19 against the lower spring mounted member 33.

Reciprocably slidably disposed about the periphery of the clamping punch member 34 is a holddown member 35 having an annular nose flange depending inner peripheral projection 37 which is contoured to fit with some snugness within the upwardly opening groove defined between the marginal cover portion 20 and the axially extending worked marginal extremity flange portion W. By means of the holddown nose flange 37, the cross-sectionally curved cover marginal portion 20 is pressed into an upwardly opening complementary annular transversely curved forming groove 38 on a stationary forming die member 39 having an inside diameter 40 substantially the same as the inside diameter of the cover marginal portion S and providing a reciprocable guide for the spring mounted reciprocable central cover supporting member 33. It will be observed that the inside diameter of the holddown member 35 is substantially the same as the outside diameter of the cylindrical marginal cover portion S and that the upper clamping and pressing member 34 is of an outside diameter substantially the same as the outside diameter of the cover portion S for slidably cooperating with the inner diameter or periphery of the reciprocable holddown member 35.

The construction and relationship of the several die members is such that after the holddown member 35 has been moved downwardly to effect clamping holddown of the cover marginal portion 20 within the shaping groove 38 by means of the holddown nose 37, axially downward pressure exerted by the pressing and pressure member 34 drives the axially extending, cylindrical cover marginal portion S down into the groove 38 and causes the cover marginal portion 20 to work smoothly between the opposing gripping, working surfaces provided by the holddown nose member 37 and the groove 38, with consequent turning and further working of the portion S into continuation of the curvature of the marginal portion 20 and until the cover marginal portion 20 has been worked and moved radially outwardly for concealing disposition relative to the retaining finger portions 25, 27 as shown in Figure 8.

During such working, curling, and axial shortening accompanied by radial projection of the cover marginal portion 20, the finger portions 22 of the axially worked flange portion W are held against distortion and to the diameter thereof by segmental radially reciprocable holding and sizing die members 41 which may be reciprocably supported by the lower die member 39 and have end portions thereof complementary to the outside diameter of the holddown nose portion 37 so that by driving the ends of the segmental die members 41 thereagainst, the cover finger flange portions 22 will be clamped in place. The upper inner corners of the segmental die members 41 are preferably rabbeted or notched out or grooved as at 42 to clear the retaining finger terminals 27. Furthermore, the segmental die members 41 are provided with oblique respective sizing surfaces 43 which overlie the radially outer portions of the forming groove 38 for sizing the underturned shoulder flange portion 21 as the cover marginal portion 20 is worked radially outwardly in the groove. For this purpose, a bending fulcrum 44 is provided at juncture of the oblique surface 43 and the vertical nose end extremity of the segmental die 41. Through this arrangement, the juncture rib 23 of the cover flange is bent about the fulcrum 44 as the underturned flange portion 21 is swung toward the sizing surface 43 and the juncture bend 32 becomes progressively more acute. It will be appreciated that there may be as many of the hold-in and sizing segmental die members 41 as preferred which will coact about the entire periphery of the cover blank to hold the finger portions 22 in place during the final shaping and sizing.

After the final shaping and sizing has been completed by downward stroke of the pressure die member 34 to the limit of movement wherein the cover marginal rib-like portion 20 has been worked and sized and the underturned flange portion 21 has been fully sized, the die members 34 and 35 are backed off and the reciprocable segment dies 41 are backed off and the completed cover removed.

By reason of the substantial and repeated working of the cover marginal rib portion 20 and the underturned flange 21 a highly resilient marginal structure is provided in cooperation with the stiffly resilient retaining fingers 22 to impart highly effective self-retaining characteristics to the retaining fingers.

By varying the width of the marginal rib of the cover blank and by correspondingly varying the width of the hold-down and forming nose portion of the die mechanism, variations as desired within reasonable limits can be attained in the marginal structure of the cover and more particularly in the underturned marginal flange. Thus, as depicted by way of example in Figures 9 and 10, a shorter underturned flange and thus proportionately longer retaining finger flanges. It will be noted in Figures 9 and 10 that except for slightly different portions in the cover marginal rib and the forming nose rib that fits into it as well as a proportionate shortening of the segment die nose end, the construction and operation are identical with the construction and operation and relationships are the same as in Figures 7 and 8. Accordingly, identical reference numerals are used in Figures 9 and 10 but primed to differentiate.

On comparison of Figures 7 and 9, it will be observed that the die forming nose portion 37' is somewhat wider than the die nose portion 37. However, the forming groove 38' is of the same width and radius as the forming groove 38. Also, the width of the rib 20' is correspondingly greater than the width of the rib 20. Other proportions and relationships are corelated. The net effect is that the sizing surface 43' is shorter than the sizing surface 43 and the bending fulcrum 44' is closer to the forming groove 38' than the bending fulcrum 44. Hence, when the die apparatus has functioned to complete working and shaping of the rib 20' as show in Figure 10, the underturned flange 21' is shorter than the corresponding underturned flange 21. On the other hand, the finger flange 22' is longer than the finger flange 22.

In Figures 11 and 12 is shown how through similar die apparatus a substantially wider marginal rib formation on the cover can be worked. In this particular instance, which of course is only exemplary of a substantial range of variation, the marginal rib of the cover is substantially wider while the underturned flange and retaining finger structure are substantially the same as in the cover 10. In view of the substantial identity of the several related structures, similar reference numerals are applied as in Figures 7 and 8 but double primed to distinguish the same.

It will be observed in Figures 11 and 12 that the initial width of the annular marginal cover rib 20'' is substantially wider than in either of Figures 7 or 9 and that the forming groove 38'' is substantially larger in radius than the groove 38 or the groove 38'. Through this arrangement, in the completed shape of the cover margin as shown in Figure 12 at the end of the working stroke of the die members 34'' and 33'', the marginal rib 20'' is substantially wider and shallower than in the forms of the cover described hereinabove. Nevertheless, the underturned marginal flange 21'' may be substantially the same as the underturned flange 21, and the length and shape of the retaining finger flanges 22'' substantially the same as the length and shape of the retaining finger flanges 22.

In order to afford greater resilient stiffness in the relatively wide finished marginal rib 20'', it may be additionally worked after completion of the radially outward working thereof. To this end, as shown in Figure 13, as a final working of the marginal rib 20'' it may be provided with a generally axially inwardly indented or pressed groove 50 which provides a further work harden area at the radially inner side of the rib 20'' with actually an inverted or axially inwardly directed rib formation joined to the original contours of the rib 20'' on axially inner and axially outer stiffening small radius juncture ribs 51 and 52, respectively.

Where preferred, the indented annular reinforcing working of the rib 20'' may be in the radially outer portion thereof as shown in Figure 14. To this end a groove 60 of substantial width may be formed in the rib 20'' by pressing the same inwardly from the dash outline position to the full outline position to provide an inwardly directed annular reinforcing rib joined at its radially inner side to the remainder of the marginal rib formation 20'' on a small radius juncture rib 61 while at its radially outer side the juncture rib 32'' provides a relatively rigid reinforcement.

After formation of the cover has been completed, it may be subjected to polishing and plating if desired or other type of finish.

It will be understood that modifications and variations may be effected without departing from the scope of the novel concepts of the present invention.

I claim as my invention:

1. In a method of making sheet metal wheel covers, shaping a sheet metal blank into a circular wheel cover form with a generally axially outwardly projecting annular marginal rib having a radially outer generally axially inwardly extending flange portion and a radially inner generally axially extending flange portion joined to the body of the cover, and while maintaining the radially outer flange portion of the rib in substantially predetermined axial position, pressing axially outwardly upon the body portion especially adjacent to said juncture and thereby moving said radially inner flange generally axially outwardly and radially outwardly to turn the rib generally radially outwardly.

2. In a method of making sheet metal wheel covers, shaping a circular cover form in a sheet metal blank and forming at the margin of such form a substantially axially outwardly projecting annular rib having radially inner and outer wall portions with the inner of such wall portions joined to the body portion of the cover form, and while maintaining an axially inner portion of the radially outer wall of the rib in substantially fixed axial and radial disposition moving the body portion axially outwardly and by generally axially outward pressure thereby applied to the radially inner wall portion of the rib turning the rib generally radially outwardly into overlying relation to the axially inner portion of the outer wall.

3. In a method of making sheet metal wheel covers, shaping a sheet metal blank into a circular body form with an annular axially outwardly projecting marginal hollow rib provided with a generally axially extending radially inner wall portion joined to the body form and merging into a generally radially and axially outwardly sloping crown portion, engaging said crown portion on the axially inner and outer sides thereof, and thrusting axially outwardly on said axially extending radially inner wall portion to thereby work said crown portion and the axially extending inner wall portion generally radially and axially outwardly.

4. In a method of making sheet metal wheel covers, shaping a sheet metal blank of polygonal form having corner portions into a circular cover form with the corner portions projecting laterally therefrom, trimming said corner portions to provide retaining finger extensions laterally about the circular form, marginally turning said circular form and the finger extensions into an axially inwardly extending flange structure from which the finger extensions project generally axially inwardly, and while holding the axially extending flange substantially against axial displacement applying axially outward and radially outward pressure to the marginal portion of the cover form contiguous the axially extending flange to move said contiguous marginal portion radially outwardly into overlying relation to said finger extensions.

5. In a method of making sheet metal wheel covers, shaping a sheet metal blank into a circular cover body form with a marginal rib extending axially outwardly relative to the cover body and shaped arcuately on a predetermined radius and merging with a straight axially inwardly projecting cylindrical flange to afford cover retaining means, holding said flange in at least the axially innermost portion thereof to the diameter of said axially extending flange and also substantially against axial displacement, and while thus holding said at least axially inner portion of said flange moving at least the portion of the cover body contiguous said rib axially outwardly to thus move the contiguous portion of the rib and guiding the rib in its radius axially outwardly and radially outwardly into overlying relation to said at least axially outwardly inner portion of said flange responsive to said axially outward movement of said portion of the cover body.

6. In a method of making sheet metal wheel covers, shaping a sheet metal blank into a circular cover body form with a marginal rib extending axially outwardly relative to the cover body and shaped arcuately on a predetermined radius and merging with a straight axially inwardly projecting cylindrical flange to afford cover retaining means, holding said flange in at least the axially innermost portion thereof to the diameter of said axially extending flange and also substantially against axial displacement, while thus holding said at least axially inner portion of said flange moving at least the portion of the cover body contiguous said rib axially outwardly to thus move the contiguous portion of the rib and guiding the rib in its radius axially outwardly and radially outwardly into overlying relation to said at least axially inner portion of said flange responsive to said axially outward movement of said portion of the cover body, and while thus moving said rib in its radius bending the axially outer portion of the flange contiguous said rib into an oblique position angled generally radially inwardly and axially inwardly from the juncture with the rib to an angular juncture with said axially inner portion of said flange.

References Cited in the file of this patent

UNITED STATES PATENTS

| | | |
|---|---|---|
| 2,127,598 | Horn et al. | Aug. 23, 1938 |
| 2,162,734 | Lyon | June 20, 1939 |
| 2,163,003 | Lyon | June 20, 1939 |
| 2,163,005 | Lyon | June 20, 1939 |
| 2,282,588 | Lyon | May 12, 1942 |
| 2,662,499 | Lyon | Dec. 15, 1953 |
| 2,689,539 | Lyon | Sept. 21, 1954 |
| 2,707,449 | Lyon | May 3, 1955 |
| 2,747,940 | Tracy | May 29, 1956 |

FOREIGN PATENTS

| | | |
|---|---|---|
| 486,487 | Canada | Sept. 16, 1952 |